United States Patent
Li et al.

(10) Patent No.: US 10,571,733 B2
(45) Date of Patent: Feb. 25, 2020

(54) BLACK MATRIX PATTERNS FOR DISPLAY PANEL AND DISPLAY DEVICE

(71) Applicant: BOE TECHNOLOGY GROUP CO., LTD., Beijing (CN)

(72) Inventors: Zhongxiao Li, Beijing (CN); Xue Dong, Beijing (CN); Xiaochuan Chen, Beijing (CN); Wenqing Zhao, Beijing (CN); Haiyan Wang, Beijing (CN); Chen Yu Chen, Beijing (CN); Xiaochen Niu, Beijing (CN); Jinye Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/767,638

(22) PCT Filed: Jul. 31, 2017

(86) PCT No.: PCT/CN2017/095177
§ 371 (c)(1),
(2) Date: Apr. 11, 2018

(87) PCT Pub. No.: WO2018/133367
PCT Pub. Date: Jul. 26, 2018

(65) Prior Publication Data
US 2019/0064580 A1 Feb. 28, 2019

(30) Foreign Application Priority Data
Jan. 22, 2017 (CN) .......................... 2017 1 0046708

(51) Int. Cl.
*G02F 1/1335* (2006.01)
*G02F 1/1343* (2006.01)

(52) U.S. Cl.
CPC .... *G02F 1/133512* (2013.01); *G02F 1/13439* (2013.01); *G02F 1/133514* (2013.01);
(Continued)

(58) Field of Classification Search
CPC ......... G02F 1/133512; G02F 1/133514; G02F 1/133516; G02F 2001/133388;
(Continued)

(56) References Cited

U.S. PATENT DOCUMENTS 9,466,018 B2 * 10/2016 Park .................... G06K 19/0772
2013/0070188 A1 3/2013 Ishikawa et al.
(Continued)

FOREIGN PATENT DOCUMENTS

CN 102629607 A 8/2012
CN 102998836 A 3/2013
(Continued)

OTHER PUBLICATIONS

International Search Report & Written Opinion, for PCT Patent Application No. PCT/CN2017/095177, dated Sep. 28, 2017, 9 pages.

*Primary Examiner* — Huyen L Ngo
(74) *Attorney, Agent, or Firm* — Kinney & Lange, P.A.

(57) ABSTRACT

Embodiments of the present disclosure provide a display panel and a display device. The display panel includes a plurality of sub-pixels each comprising a display unit. The display unit includes a first electrode, a second electrode and a liquid crystal layer. A first black matrix pattern is disposed at a side of the liquid crystal layer facing the first electrode and a second black matrix pattern is disposed at a side of the liquid crystal layer facing the second electrode, the second black matrix pattern having an opening therein, the first black matrix pattern being disposed at a position corresponding to the opening.

19 Claims, 4 Drawing Sheets

(52) U.S. Cl.
CPC ............... *G02F 1/134309* (2013.01); *G02F 2001/134345* (2013.01); *G02F 2203/30* (2013.01); *G02F 2203/64* (2013.01); *G02F 2203/66* (2013.01)

(58) Field of Classification Search
CPC ... G02F 2001/134345; G02F 2201/123; H01L 27/12; G02B 5/201
See application file for complete search history.

(56) References Cited

U.S. PATENT DOCUMENTS

| | | | |
|---|---|---|---|
| 2014/0146261 A1 | 5/2014 | Wu | |
| 2014/0226113 A1 | 8/2014 | Ishikawa et al. | |
| 2017/0186922 A1* | 6/2017 | Kim | C09K 11/703 |
| 2018/0188590 A1* | 7/2018 | Gu | G02F 1/133504 |
| 2019/0101788 A1* | 4/2019 | Zhao | G02F 1/133512 |

FOREIGN PATENT DOCUMENTS

| | | | |
|---|---|---|---|
| CN | 106226944 A | | 12/2016 |
| CN | 106707608 A | | 5/2017 |
| CN | 106773218 A | * | 5/2017 |
| CN | 106773218 A | | 5/2017 |
| CN | 10602520 A | * | 6/2017 |
| CN | 106802520 A | | 6/2017 |

\* cited by examiner

Figure 8

BLACK MATRIX PATTERNS FOR DISPLAY PANEL AND DISPLAY DEVICE

CROSS-REFERENCE TO RELATED APPLICATION

This application is the national phase of PCT Application No. PCT/CN2017/095177 filed on Jul. 31, 2017, which in turn claims the priority benefit of Chinese Patent Application No. 2017100467084 titled "DISPLAY PANEL AND DISPLAY DEVICE" filed on Jan. 22, 2017 in the State Intellectual Property Office of China, the whole disclosure of which is incorporated herein by reference.

TECHNICAL FIELD

Embodiments of the present disclosure relate to technical field of display, and particularly to a display panel and a display device.

BACKGROUND

Liquid crystal display is a display device that is currently widely used, and has a series of advantages such as high color gamut, thinness and light weight, fast response, etc. There are mature technologies for the liquid crystal display in terms of theoretical research and practice process. Display principle of the current liquid crystal display is to perform gray display by using liquid crystal to modulate polarized light. A polarization sheet is a necessary component of a liquid crystal display device. However, attaching polarization sheets respectively to a light incident side and a light emitting side of a liquid crystal display panel, on one hand, will cause an increased cost of the liquid crystal display panel, and on the other hand, will lead to loss of light efficiency, where the polarization sheets may cause loss of up to 50% or more of light efficiency of the liquid crystal display panel.

SUMMARY

The present disclosure provides a display panel and a display device which may perform gray scale display without polarization sheet and may reduce cost of display device and loss of light efficiency thereof.

Embodiments of the present disclosure provide schemes as following:

In an aspect, there is provided a display panel including a plurality of sub-pixels each comprising at least one display unit; each display unit comprising a first electrode, a second electrode and a liquid crystal layer located between the first electrode and the second electrode; each display unit further comprising a first black matrix pattern at a side of the liquid crystal layer facing the first electrode and a second black matrix pattern at a side of the liquid crystal layer facing the second electrode, the second black matrix pattern having an opening therein; wherein the first black matrix pattern and the opening are configured such that, in a state where no electric field is generated between the first electrode and the second electrode, collimated light incoming from the opening is fully shield by the first black matrix pattern, and such that, in a state where an electric field is generated between the first electrode and the second electrode, the collimated light incoming from the opening is refracted by the liquid crystal layer between the first electrode and the second electrode such that at least a part of the refracted collimated light bypasses the first black matrix pattern and exits from the display panel.

In an embodiment, an orthographic projection of the opening onto the first black matrix pattern is of superposition with a corresponding first black matrix in the first black matrix pattern.

In an embodiment, an orthographic projection of the opening onto the first black matrix pattern is completely located within a corresponding first black matrix in the first black matrix pattern.

In an embodiment, the first electrode is a plate electrode and the second electrode is a strip-shaped electrode, such that the electric field is adjustable by applying different electric signals onto the electrodes respectively to make the liquid crystal layer being equivalent to a right angle prism so as to change an optical path of the collimated light and refract the incident collimated light such that at least a part of the refracted collimated light bypasses the first black matrix pattern to exit from the display panel.

In an embodiment, the first electrode is a plate electrode and the second electrode is a strip-shaped electrode, such that the electric field is adjustable by applying different electric signals onto the first electrode and the second electrode respectively to make the liquid crystal layer being equivalent to an isosceles triangle prism, which reflects the incident collimated light in two directions or four directions and changes an optical path of the collimated light so as to refract the collimated light such that at least a part of the refracted collimated light bypasses the first black matrix pattern to exit from the display panel.

In an embodiment, both the first electrode and the second electrode are strip-shaped electrodes, and a direction in which the first electrode extends is perpendicular to a direction in which the second electrode extends.

In an embodiment, the liquid crystal layer comprises a first sub-liquid crystal layer and a second sub-liquid crystal layer, and the display unit further includes a plate-shaped third electrode and a plate-shaped fourth electrode that are located between the first electrode and the second electrode, the fourth electrode is located at a side of the third electrode that facing away from the first electrode, the first sub-liquid crystal layer is disposed between the first electrode and the third electrode and the second sub-liquid crystal layer is disposed between the second electrode and the fourth electrode, the first sub-liquid crystal layer is configured to, under an electric field generated between the first electrode and the third electrode by applying electric signals onto the first electrode and the third electrode, refract the collimated light with a polarization direction that is a first direction; and the second sub-liquid crystal layer is configured to, under an electric field generated between the second electrode and the fourth electrode by applying electric signal onto the second electrode and the fourth electrode, refract the collimated light with a polarization direction that is a second direction, the first direction being perpendicular to the second direction.

In an embodiment, the display unit further includes: a color filter sheet disposed on a side of the first electrode.

In an embodiment, the color filter sheet is disposed in the same layer as the first black matrix pattern and surrounds the first black matrix pattern.

In an embodiment, the display unit has a length in a range from 10 μm to 20 μm.

In an embodiment, the display unit further comprises: an atomizing film disposed at a side of the first electrode.

Embodiments of the present disclosure further provide a display device including the above display panel.

In an embodiment, the display device further includes a backlight source disposed at a light incident side of the display panel and configured to supply the collimated light for being incident to the display panel.

DETAILED DESCRIPTION OF THE EMBODIMENTS

A detail description will be made with reference to the drawings and exemplary embodiments in order to make the technical problems to be solved, technical schemes and advantages of the embodiments of the present disclosure more definite.

Embodiments of the present disclosure aim to the problem in prior art that polarization sheets need to be attached to an light incident side and a light emitting side of a liquid crystal display panel, which, on one hand, causes increase of cost, and one the other hand, degrades light efficiency, and thus provide a display panel and a display device that may perform gray display without polarization sheet and thus reduce its cost and loss of light efficiency.

Figure 1:
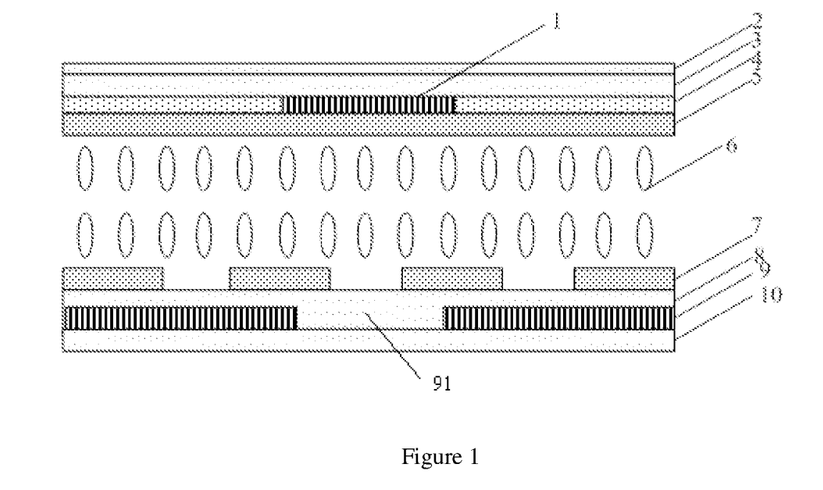
FIG. 1 is a cross sectional schematic view of a display panel according to an embodiment of the present disclosure.

An embodiment of the present disclosure provides a display panel that includes a plurality of sub-pixels each including at least one display unit. As shown in FIG. 1, each display unit includes a first electrode 5, a second electrode 7 and a liquid crystal layer 6 located between the first electrode 5 and the second electrode 7. A first black matrix pattern 1 is provided at a side of the first electrode and a second black matrix pattern 9 is provided at a side of the second electrode. The second black matrix pattern 9 has an opening 91 and the first black matrix pattern 1 is disposed at a position corresponding to the opening 91.

When an electrical field is generated between the first electrode 5 and the second electrode 7, the liquid crystal layer 6 between the first electrode 5 and the second electrode 7 may refract collimated light incoming from the opening 91 such that at least a part of the refracted collimated light may bypass the first black matrix pattern 1 and exit from the display panel; when no electrical field is generated between the first electrode 5 and the second electrode 7, the collimated light incoming from the opening 91 can be completely shielded by the first black matrix pattern 1.

In the embodiment, when an electrical field is generated between the first electrode and the second electrode, the liquid crystal layer between the first electrode and the second electrode may refract the collimated light incoming from the opening 91 of the second black matrix pattern 2 such that at least a part of the refracted collimated light after may bypass the first black matrix pattern 1 and exit from the display panel, thereby achieving a gray-scale display; when no electrical field is generated between the first electrode and the second electrode, the collimated light incoming from the opening can be completely shielded by the first black matrix pattern, thereby achieving a dark-state display. According to the technical schemes of the embodiment, a gray-scale display may be achieved without any polarized sheet and thus product cost of the display device is reduced and loss of light efficiency is decreased.

In an embodiment, as shown in FIG. 1, the first electrode 5 and the first black matrix pattern 1 are both disposed on a first base substrate 3, the second electrode 7 and the second black matrix pattern 9 are both disposed on the second base substrate 10, and an orthographic projection of the opening 91 of the second black matrix pattern 9 onto the first base substrate 3 may be overlapped with an orthographic projection of the first black matrix pattern 1 onto the first base substrate 3.

In an embodiment, the orthographic projection of the opening 91 of the second black matrix pattern 9 onto the first black matrix pattern 1 may full fall within the first black matrix pattern 1. With this configuration, it ensures that the first black matrix pattern 1 may completely shield the collimated light incoming from the opening 91 without light leakage when no electrical field is generated between the first electrode 5 and the second electrode 7.

In an embodiment, as shown in FIGS. 1-4, the display panel includes a first base substrate 3 and a second base substrate 10 that are disposed and assembled into a cell, and a liquid crystal layer 6 is provided between the first base substrate 3 and the second base substrate 10; a black matrix pattern 1, a color filter sheet 4 and a first electrode 5 are in turn provided on a side of the first base substrate 3 that faces the second base substrate 10, wherein the color filter sheet 4 and the first black matrix pattern 1 are disposed in a same layer, and the color filter sheet 4 surrounds the first black matrix pattern 1, or in other words, the first black matrix pattern 1 is embedded in the color filter sheet 4, such that at least a part of the light that is refracted by the liquid crystal layer 6 may bypass the first black matrix pattern 1 and is emitted out of the display panel via the color filter sheet 4, achieving a color display. Further, the color filter sheet 4 and the first black matrix pattern 1 may play a role of flatting, covering wirings formed on the first base substrate 3. A second black matrix pattern 9, an insulating layer 8 and a second electrode 7 are in turn provided on a side of the second base substrate 10 that faces the first base substrate 3, the insulating layer 8 plays a role of flatting and covers a thin film transistor array and wirings formed on the second base substrate 10, the second black matrix pattern 9 has an opening 91, and an orthographic projection of the opening 91 onto the first black matrix pattern 1 falls within a region where the first black matrix pattern 1 is located. In the embodiment, the insulating layer 8 covers the second black matrix pattern 9 and also covers the opening 91 in the second black matrix pattern 9.

In an embodiment of the present disclosure, a light source for the display panel may produce collimated white light, which is irradiated to the display panel via the opening 91 in the second black matrix pattern 9, and passes through the liquid crystal layer 6. Liquid crystal molecules in the liquid crystal layer 6 are deflected by applying an electric field between the first electrode 5 and the second electrode 7. Deflection angles of the liquid crystal molecules at various positions in the liquid crystal layer 6 may be adjusted by adjusting the strength of the electric field between the first electrode 5 and the second electrode 7 by applying different electric signals onto the electrodes.

Figure 2:
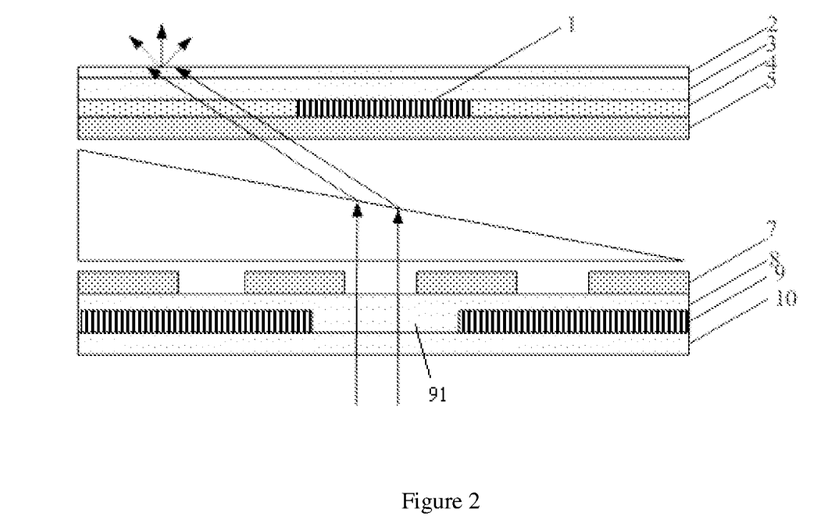
FIG. 2 is a schematic view of an optical path of a display panel in a bright state of display according to an embodiment of the present disclosure.

In the embodiment as shown in FIG. 2, the first electrode 5 is a plate electrode and the second electrode 7 is a strip-shaped electrode. The electric field may be adjusted by applying different electric signals onto the electrodes such that the liquid crystal layer 6 may be equivalent to a right angle prism so as to change an optical path of the collimated light, i.e., to refract the incident collimated light such that at least a part of the light bypasses the first black matrix pattern 1 and is emitted out of the display panel. As the refracted light is emitted out of the display panel after passing through the color filter sheet 4, a color display may be achieved.

Figure 3:
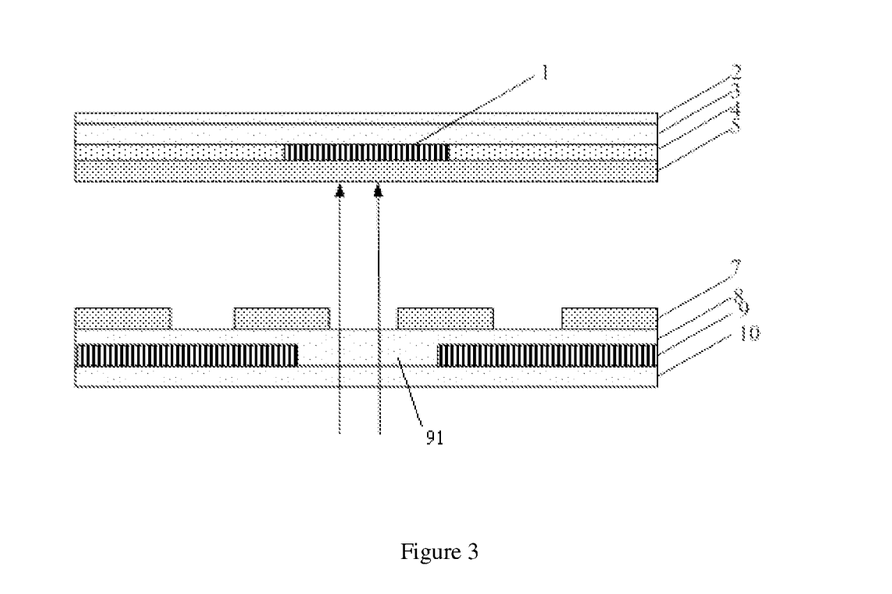
FIG. 3 is a schematic view of an optical path of a display panel in a dark state of display according to an embodiment of the present disclosure.

As shown in FIG. 3, when no electric signal is applied onto the first electrode 5 and the second electrode 7 and thus no electric field is generated therebetween, the incident collimated light from the opening 91 in the second black matrix pattern 9 is transmitted along a straight line without being deflected and thus is blocked by the first black matrix pattern 1. In this instance, no light is emitted out of the display panel and the display panel displays a dark state.

The incident collimated light may be deflected at different angles by the liquid crystal layer 6 by adjusting the voltage values of the electric signals applied onto the first electrode 5 and the second electrode 7, such that a part of the light exits from the display panel via the color filter sheet and another part of the light is absorbed by the first black matrix pattern 1. A gray scale display may be achieved by adjusting a ratio between the two parts of the light.

Figure 4:
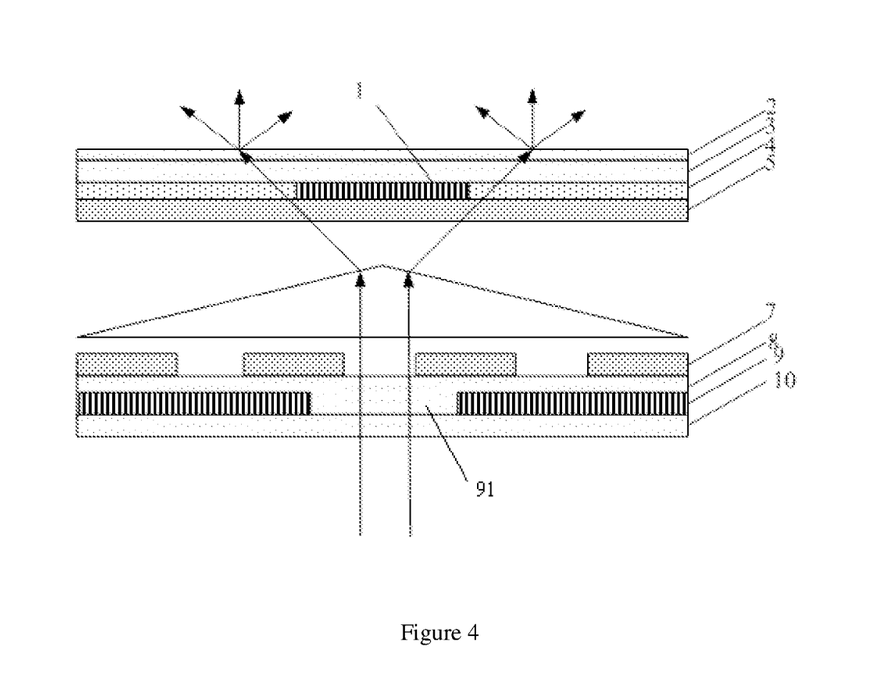
FIG. 4 is another schematic view of an optical path of a display panel in a bright state of display according to an embodiment of the present disclosure.

In an embodiment, as shown in FIG. 4, the liquid crystal layer 6 may be equivalent to an isosceles triangle prism by adjusting the voltages of the electric signals applied onto the first electrode 5 and the second electrode 7, such that the incident collimated light is deflected towards two directions, and is emitted out of the display panel at either side of the first black matrix pattern 1, thereby achieving more uniform light emitting from the display panel.

Figure 5:
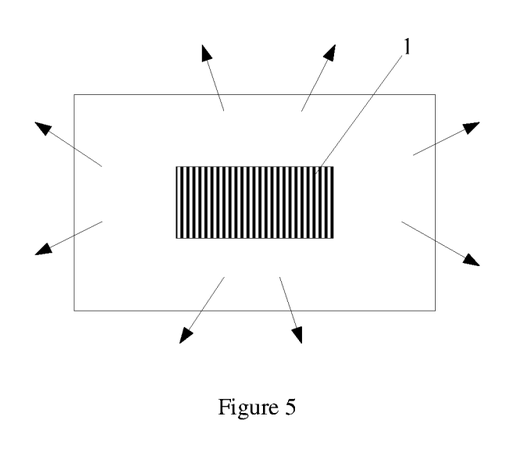
FIG. 5 is a schematic view of a display panel in a state of emitting light according to an embodiment of the present disclosure.

In an embodiment, as shown in FIG. 5, the incident collimated light may be deflected towards four directions, by adjusting the voltage values of the electric signals applied onto the first electrode 5 and the second electrode 7, and exits the display panel at four sides of the first black matrix pattern 1, thereby achieving more uniform light emitting from the display panel.

The sub-pixel of the display panel may include one or more display units and a length of the display unit is in a range from 10 µm to 20 µm. With process level increasing, the length of the display unit may further be reduced to less than 10 µm.

In the structure shown in FIG. 4, one of the electrodes at both sides of the liquid crystal cell is a strip-shaped electrode and the other is a plate electrode, thus only light in a single polarization direction may be refracted in the structure.

Figure 6:
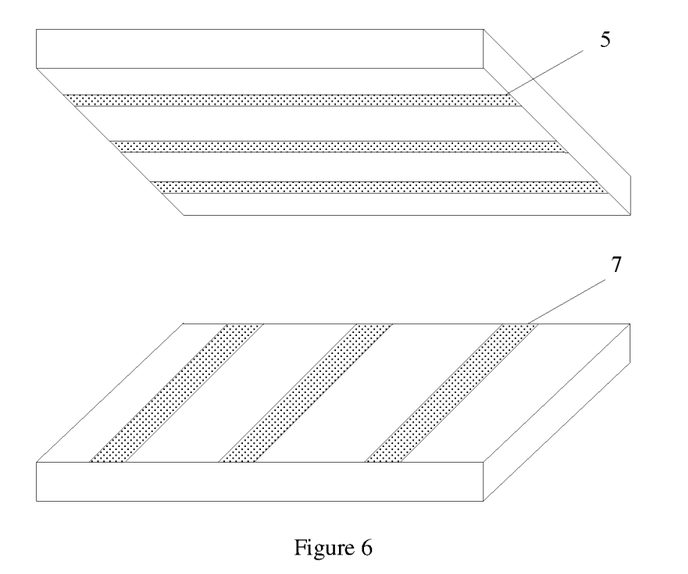
FIG. 6 is schematic view illustrating electrodes on two substrates, opposite to each other, of a display panel according to an embodiment of the present disclosure.

In an embodiment of the present disclosure, as shown in FIG. 6, the first electrode 5 may designed as a strip-shaped electrode, the second electrode 7 may be designed as a strip-shaped electrode, and a direction in which the first electrode 5 extends is perpendicular to a direction in which the second electrode 7 extends, such that a single liquid crystal cell, when configured between the first electrode 5 and the second electrode 7, may refract the light whose polarization directions are perpendicular to each other, that is, may refract the collimated light with various polarization directions.

In another exemplary embodiment of the present disclosure, the display panel according to the embodiment may be implemented to include double liquid crystal cells. In the embodiment, the liquid crystal layer includes a first sub-liquid crystal layer and a second sub-liquid crystal layer. The display unit further includes a plate shaped third electrode and a plate shaped fourth electrode between the first electrode and the second electrode, the fourth electrode is located at a side of the third electrode that faces away from the first electrode, the first sub-liquid crystal layer is provided between the first electrode and the third electrode and the second sub-liquid crystal layer is provided between the second electrode and the fourth electrode.

The first sub-liquid crystal layer may refract the collimated light with a polarization direction that is a first direction, under the electric field generated between the first electrode and the third electrode when applying electric signals onto the first electrode and the third electrode.

The second sub-liquid crystal layer may refract the collimated light with a polarization direction that is a second direction, under the electric field generated between the second electrode and the fourth electrode when applying electric signals onto the second electrode and the fourth electrode, the first direction being perpendicular to the second direction.

With this configuration, electric signals are applied onto the first electrode and the third electrode such that an electric field is generated between the first electrode and the second electrode to drive the liquid crystal molecule in the first sub-liquid crystal layer to deflect and thus the first sub-liquid crystal layer may refract the collimated light with the polarization direction that is the first direction; and, the second sub-liquid crystal layer is located between the second electrode and the fourth electrode, so that an electric field generated between the second electrode and the fourth electrode by applying electric signals onto the second electrode and the fourth electrode may drive the second the liquid crystal molecule in the second sub-liquid crystal layer to deflect, and thus the second sub-liquid crystal layer may refract the collimated light with the polarization direction that is the second direction, the first direction being perpendicular to the second direction. As such, the first sub-liquid crystal layer and the second sub-liquid crystal layer may cooperate with each other to achieve refraction of light with different polarization directions.

Figure 7:
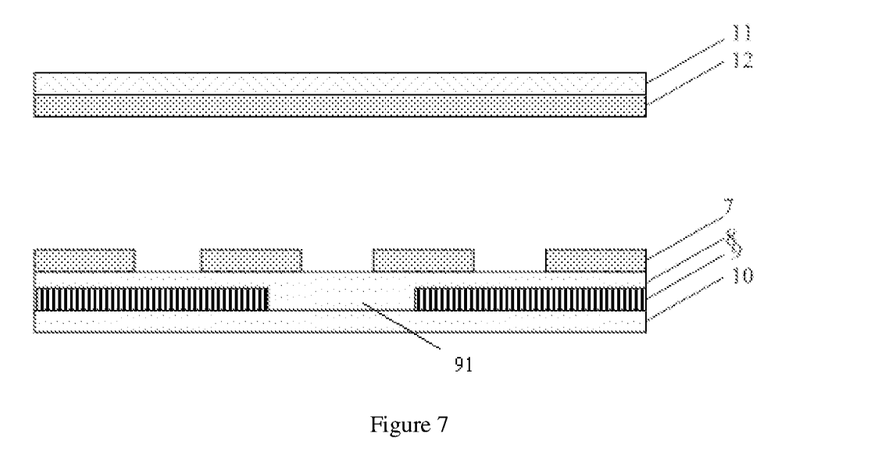
FIG. 7 and FIG. 8 are schematic views of sub-display panels according to an embodiment of the present disclosure respectively.
Figure 8:
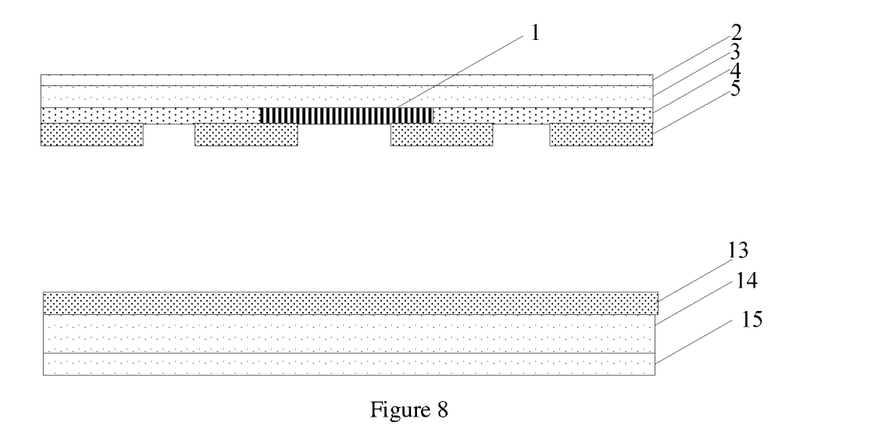

Specifically, a display panel where double liquid crystal cells are adopted includes a sub-display panel as shown in FIG. 7 and a sub-display panel as shown in FIG. 8. The two sub-display panels are stacked and attached to each other with glass cement joining entire surfaces of them. It is desired that the two sub-display panels are accurately aligned with each other, ensuring the opening 91 of the second black matrix pattern 9 is of superposition with a center of the first black matrix pattern 1, and the sub-display panel as shown in FIG. 7 is located at a light incident side and the sub-display panel as shown in FIG. 8 is located at a light output side.

As shown in FIG. 7, one of the sub-display panels includes a second base substrate 10 and a second opposite sub base substrate 10 that are disposed and assembled into a cell. A plate shaped fourth electrode 12 is provided on a side of the second opposite sub base substrate 10 that faces towards the second base substrate 10, a second black matrix pattern 9, an insulating layer 8 and a second electrode 7 are provided on a side of the second base substrate 10 that faces towards the second opposite sub base substrate 10 and a second sub-liquid crystal layer is disposed between the second electrode 7 and the fourth electrode 12. As shown in FIG. 8, the other of sub-display panels includes a first base substrate 3 and a first opposite sub base substrate 15 that are disposed and assembled into a cell. An insulating layer 14 and a plate shaped third electrode 13 are provided on a side of the first opposite sub base substrate 15 that faces towards the first base substrate 3, and a first black matrix pattern 1, a color filter sheet 4 and a first electrode 5 are provided on a side of the first base substrate 3 that faces towards the first opposite sub base substrate 15.

FIG. 7 is a schematic cross sectional view of a sub-display panel taken in an X-axis direction and FIG. 8 is a schematic cross sectional view of another sub-display panel taken in a Y-axis direction. It is assumed that the X-axis direction and the Y-axis direction are defined as a horizontal direction and a vertical direction respectively. In this instance, the sub-display panel shown in FIG. 7 may modulate polarization light of the horizontal direction and the sub-display panel shown in FIG. 8 may modulate polarization light of the vertical direction, such that the display panel formed by stacking the sub-display panel shown in FIG. 7 with the sub-display panel shown in FIG. 8 may modulate light with various polarization directions for enabling display. A light emitting schematic view for the sub-display panels shown in FIGS. 7 and 8 is similar to that shown in FIG. 5. Applying electric signals with different voltage values onto the electrodes may make the liquid crystal layer to be equivalent to prisms with different refractive indexes, so as to control deflection angle of the light, achieving the gray scale display. As the electrodes of upper and lower liquid crystal cell of the display panel configured as shown in FIG. 7 and FIG. 8 may be controlled individually, a more exquisite gray display may be achieved. It is noted that the liquid crystal layer between the base substrates of the sub base substrate as shown in FIGS. 7 and 8 is not shown.

In an embodiment, as the refracted light is still collimated light that has a relative small visual angle, as shown in FIGS. 1-4, the display unit may further include an atomizing film 2, which is disposed on a side of the liquid crystal layer close to the first electrode, and which may scatter the outputted collimated light so as to increase the visual angle of the display panel. Specifically, the atomizing film 2 may be located on a side of the first base substrate 3 that faces away from the first black matrix pattern 1.

Embodiments of the present disclosure further provide a display device including the above display panel. The display device may be a product or component that has a displaying function, such as a liquid crystal television, a liquid crystal display, a digital photo frame, a mobile phone, a tablet computer or the like. The display device may further include a flexible circuit board, a printed circuit board and a back plate.

In an embodiment, the display device may further include a backlight source disposed at the light incident side of the display panel. The backlight source is configured to provide incident collimated light for the display panel.

The above disclosed contents are exemplary embodiments of the present disclosure. It is noted that improvements and modifications to the above embodiments may be made by those skilled in the art without departing from the principle of the present disclosure. The improvements and modifications are also covered by the protective scope of the present disclosure.

The invention claimed is:

1. A display panel, comprising a plurality of sub-pixels each comprising at least one display unit; each display unit comprising a first electrode, a second electrode and a liquid crystal layer located between the first electrode and the second electrode; each display unit further comprising a first black matrix pattern at a first side of the first electrode away from the liquid crystal layer and a second black matrix pattern at a second side of the second electrode away from the liquid crystal layer, the second black matrix pattern having an opening therein;

wherein the first black matrix pattern and the opening are configured such that, in a state where no electric field is generated between the first electrode and the second electrode, collimated light incoming from the opening is fully shielded by the first black matrix pattern, and such that, in a state where an electric field is generated between the first electrode and the second electrode, the collimated light incoming from the opening is refracted by the liquid crystal layer between the first electrode and the second electrode such that at least a part of the refracted collimated light bypasses the first black matrix pattern and exits from the display panel.

2. The display panel according to claim 1, wherein an orthographic projection of the opening onto the first black matrix pattern is of superposition with a corresponding first black matrix in the first black matrix pattern.

3. The display panel according to claim 2, wherein the display unit further comprises: an atomizing film disposed at the first side of the liquid crystal layer facing the first electrode.

4. The display panel according to claim 1, wherein an orthographic projection of the opening onto the first black matrix pattern is completely located within a corresponding first black matrix in the first black matrix pattern.

5. The display panel according to claim 4, wherein the display unit further comprises: an atomizing film disposed at the first side of the liquid crystal layer facing the first electrode.

6. The display panel according to claim 1, wherein the first electrode is a plate electrode and the second electrode is a strip-shaped electrode, such that the electric field is adjustable by applying different electric signals onto the first and second electrodes respectively to make the liquid crystal layer be equivalent to a right angle prism so as to change an optical path of the collimated light and refract the incident collimated light such that at least a part of the refracted collimated light bypasses the first black matrix pattern to exit from the display panel.

7. The display panel according to claim 6, wherein the display unit further comprises: an atomizing film disposed at the first side of the liquid crystal layer facing the first electrode.

8. The display panel according to claim 1, wherein the first electrode is a plate electrode and the second electrode is a strip-shaped electrode, such that the electric field is adjustable by applying different electric signals onto the first electrode and the second electrode respectively to make the liquid crystal layer be equivalent to an isosceles triangle prism, which reflects the incident collimated light in two directions or four directions and changes an optical path of the collimated light so as to refract the collimated light such that at least a part of the refracted collimated light bypasses the first black matrix pattern to exit from the display panel.

9. The display panel according to claim 8, wherein the display unit further comprises: an atomizing film disposed at the first side of the liquid crystal layer facing the first electrode.

10. The display panel according to claim 1, wherein both the first electrode and the second electrode are strip-shaped electrodes, and a direction in which the first electrode extends is perpendicular to a direction in which the second electrode extends.

11. The display panel according to claim 10, wherein the liquid crystal layer comprises a first sub-liquid crystal layer and a second sub-liquid crystal layer, and the display unit further includes a plate-shaped third electrode and a plate-shaped fourth electrode that are located between the first electrode and the second electrode, the fourth electrode is located at a side of the third electrode that facing away from the first electrode, the first sub-liquid crystal layer is disposed between the first electrode and the third electrode and the second sub-liquid crystal layer is disposed between the second electrode and the fourth electrode, the first sub-liquid crystal layer is configured to, under an electric field generated between the first electrode and the third electrode by applying electric signals onto the first electrode and the third electrode, refract the collimated light with a polarization direction that is a first direction; and the second sub-liquid crystal layer is configured to, under an electric field generated between the second electrode and the fourth electrode by applying electric signal onto the second electrode and the fourth electrode, refract the collimated light with a polarization direction that is a second direction, the first direction being perpendicular to the second direction.

12. The display panel according to claim 10, wherein the display unit further comprises: an atomizing film disposed at the first side of the liquid crystal layer facing the first electrode.

13. The display panel according to claim 1, wherein the display unit further comprises: a color filter sheet disposed on a side of the first electrode.

14. The display panel according to claim 13, wherein the color filter sheet is disposed in the same layer as the first black matrix pattern and surrounds the first black matrix pattern.

15. The display panel according to claim 1, wherein the display unit has a length in a range from 10 μm to 20 μm.

16. The display panel according to claim 1, wherein the display unit further comprises: an atomizing film disposed at the first side of the liquid crystal layer facing the first electrode.

17. A display device comprising the display panel according to claim 1.

18. The display device according to claim 17, further comprising a backlight source disposed at a light incident side of the display panel and configured to supply the collimated light for being incident to the display panel.

19. The display panel according to claim 1, wherein a light source of the display panel is configured to provide collimated white light.

* * * * *